(12) United States Patent
Zhu et al.

(10) Patent No.: US 10,341,895 B2
(45) Date of Patent: Jul. 2, 2019

(54) CORRELATING AND COMBINING OF MDT AND QOE METRICS

(71) Applicant: QUALCOMM Incorporated, San Diego, CA (US)

(72) Inventors: Xipeng Zhu, Beijing (CN); Nikolai Konrad Leung, San Francisco, CA (US); Min Wang, San Diego, CA (US); Amir Aminzadeh Gohari, San Diego, CA (US); Srinivasan Balasubramanian, San Diego, CA (US); Masato Kitazoe, Hachiouji (JP); Rulin Xing, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/556,122

(22) PCT Filed: Apr. 22, 2015

(86) PCT No.: PCT/CN2015/077193
§ 371 (c)(1),
(2) Date: Sep. 6, 2017

(87) PCT Pub. No.: WO2016/169008
PCT Pub. Date: Oct. 27, 2016

(65) Prior Publication Data
US 2018/0041913 A1 Feb. 8, 2018

(51) Int. Cl.
*H04W 24/10* (2009.01)
*H04W 76/27* (2018.01)
(Continued)

(52) U.S. Cl.
CPC ........... *H04W 24/10* (2013.01); *H04L 65/608* (2013.01); *H04L 65/80* (2013.01); *H04W 24/08* (2013.01); *H04W 76/27* (2018.02)

(58) Field of Classification Search
CPC ..... H04W 24/10; H04W 76/27; H04W 24/08; H04L 65/608; H04L 65/80
See application file for complete search history.

(56) References Cited

U.S. PATENT DOCUMENTS

2005/0157660 A1* 7/2005 Mandato ................. H04L 29/06
370/254
2009/0227251 A1 9/2009 Lei et al.
(Continued)

FOREIGN PATENT DOCUMENTS

JP 2014165828 A 9/2014
WO 2011157301 A1 12/2011
(Continued)

OTHER PUBLICATIONS

International Search Report and Written Opinion—PCT/CN2015/077193—ISA/EPO—dated Jan. 27, 2016.
(Continued)

*Primary Examiner* — Jenee Holland
*Assistant Examiner* — Latresa A McCallum
(74) *Attorney, Agent, or Firm* — Arent Fox, LLP

(57) ABSTRACT

A method, an apparatus, and a computer program product for wireless communication are provided. The apparatus includes an user equipment which is configured to measure Minimization of Drive Tests (MDT) metrics, to measure Quality of Experience (QoE) metrics, to generate correlation information of at least one of the MDT metrics and at least one of the QoE metrics, and to report the correlation information.

36 Claims, 14 Drawing Sheets

(51) Int. Cl.
*H04L 29/06* (2006.01)
*H04W 24/08* (2009.01)

(56) References Cited

U.S. PATENT DOCUMENTS

| | | | |
|---|---|---|---|
| 2013/0128756 A1 | 5/2013 | Zhang et al. | |
| 2013/0223233 A1 | 8/2013 | Zhao et al. | |
| 2014/0087716 A1* | 3/2014 | Vaderna | H04L 43/50 455/422.1 |
| 2014/0169255 A1* | 6/2014 | Zhang | H04W 72/005 370/312 |
| 2014/0228017 A1 | 8/2014 | Chang et al. | |
| 2014/0241243 A1* | 8/2014 | Singh | H04L 1/08 370/328 |
| 2015/0065083 A1* | 3/2015 | Racz | H04W 24/08 455/405 |
| 2015/0098352 A1* | 4/2015 | Froehlich | H04W 24/08 370/252 |
| 2015/0350938 A1* | 12/2015 | Heikkila | H04W 24/08 370/252 |
| 2016/0036710 A1* | 2/2016 | Hanaoka | H04W 28/0284 370/235 |

FOREIGN PATENT DOCUMENTS

| | | |
|---|---|---|
| WO | 2012110054 A1 | 8/2012 |
| WO | 2013066333 A1 | 5/2013 |
| WO | 2013074751 A1 | 5/2013 |
| WO | 2014094818 A1 | 6/2014 |

OTHER PUBLICATIONS

QUALCOMM Incorporated: "MTSI QoE Metrics and MDT", 3GPP Draft; R2-151611 MTSI QoE Metrics and MDT, 3rd Generation Partnership Project (3GPP), Mobile Competence Centre; 650, Route Des Lucioles; F-06921, Sophia-Antipolis Cedex; France, vol. RAN WG2, No. Bratislava, Slovakia; Apr. 20, 2015-Apr. 24, 2015 Apr. 19, 2015, XP050936518, Retrieved from the Internet: URL:http://www.3gpp.org/ftp/Meetings_3GPP_SYNC/RAN2/Docs/ [retrieved on Apr. 19, 2015], 3 Pages.

Rodriguez D.Z., et al., "Improving the Minimization Drive Tests using Voice Quality Index", Consumer Electronics (ISCE), 2013 IEEE 17th International Symposium on, Jun. 1, 2013, XP055496819, DOI:10.1109/ISCE.2013.6570267, ISBN: 978-1-4673-6198-9, Retrieved from the Internet: URL:http://professores.dec.ufla.br/"demostenes/ImprovingtheMinimizationDriveTestsusingVoiceQualityIndex . . . [retrieved on Aug. 2, 2018], pp. 10-13.

Supplementary European Search Report—EP15889497—Search Authority—Munich—dated Aug. 13, 2018.

"Universal Mobile Telecommunications System (UMTS), LTE; IP Multimedia Subsystem (IMS); Multimedia telephony; Media handling and interaction (3GPP TS 26.114 version 12.9.0 Release 12)", Technical Specification, European Telecommunications Standards Institute (ETSI), 650, Route Des Lucioles; F-06921 Sophia-Antipolis; France, vol. 3GPP SA 4, No. v12.9.0, Apr. 1, 2015, XP014248374, 311 pages.

* cited by examiner

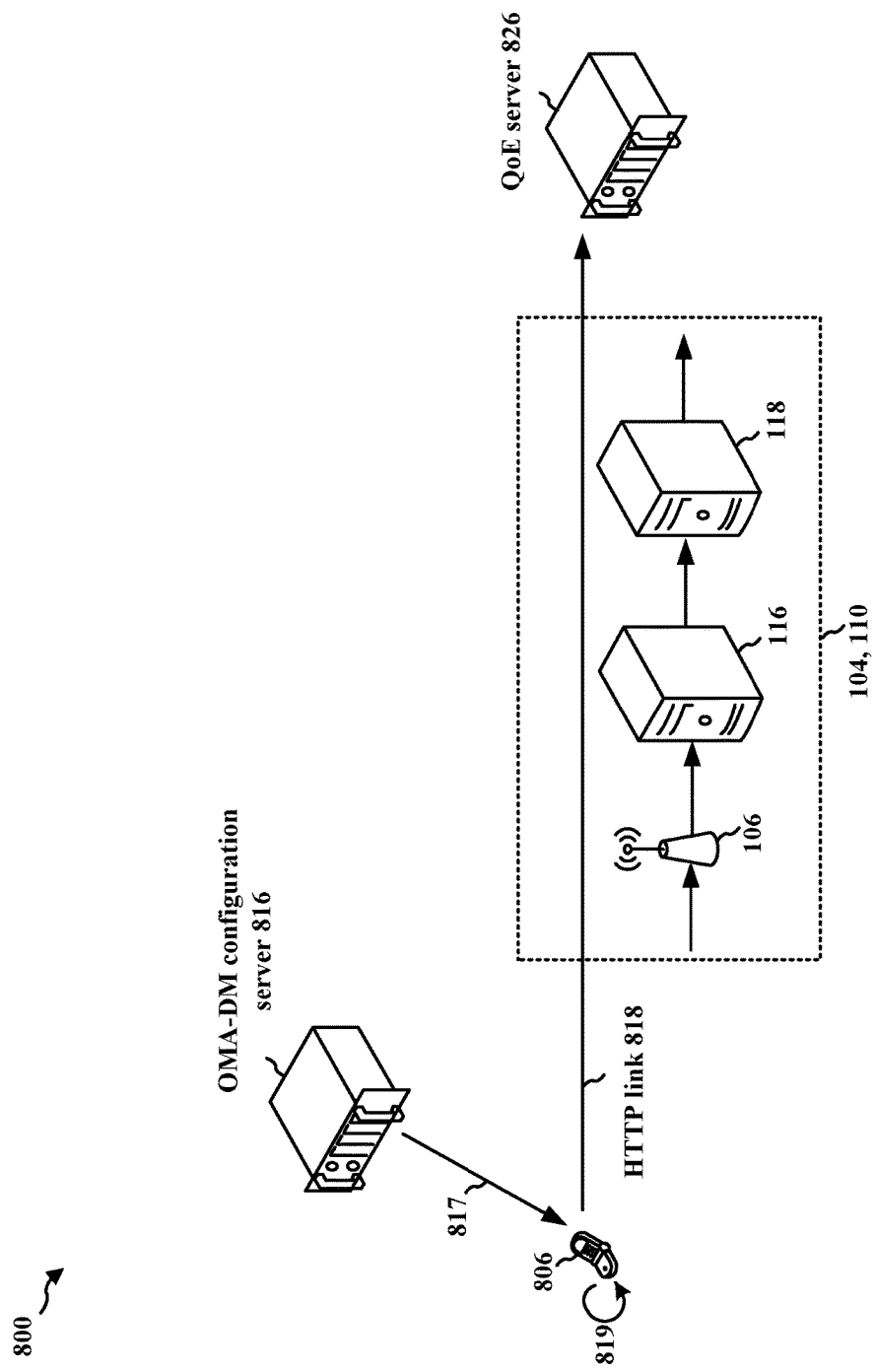

CORRELATING AND COMBINING OF MDT AND QOE METRICS

CROSS REFERENCE TO RELATED APPLICATION(S)

This application is a national stage entry of PCT application Serial No. PCT/CN2015/077193, entitled "CORRELATING AND COMBINING OF MDT AND QOE METRICS" and filed on Apr. 22, 2015, which is expressly incorporated by reference herein in its entirety.

BACKGROUND

Field

The present disclosure relates generally to communication systems, and more particularly, to methods and apparatuses for correlating and combining of different types of communication metrics.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method, a computer program product, and an apparatus are provided. The apparatus may be a user equipment that is configured to measure Minimization of Drive Tests (MDT) metrics, to measure Quality of Experience (QoE) metrics, to generate correlation information of at least one of the MDT metrics and at least one of the QoE metrics, and to report the correlation information.

BRIEF DESCRIPTION OF THE DRAWINGS

FIG. 8 is a diagram illustrating an example of a network architecture for configuring and reporting QoE metrics.

DETAILED DESCRIPTION

Figure 1:
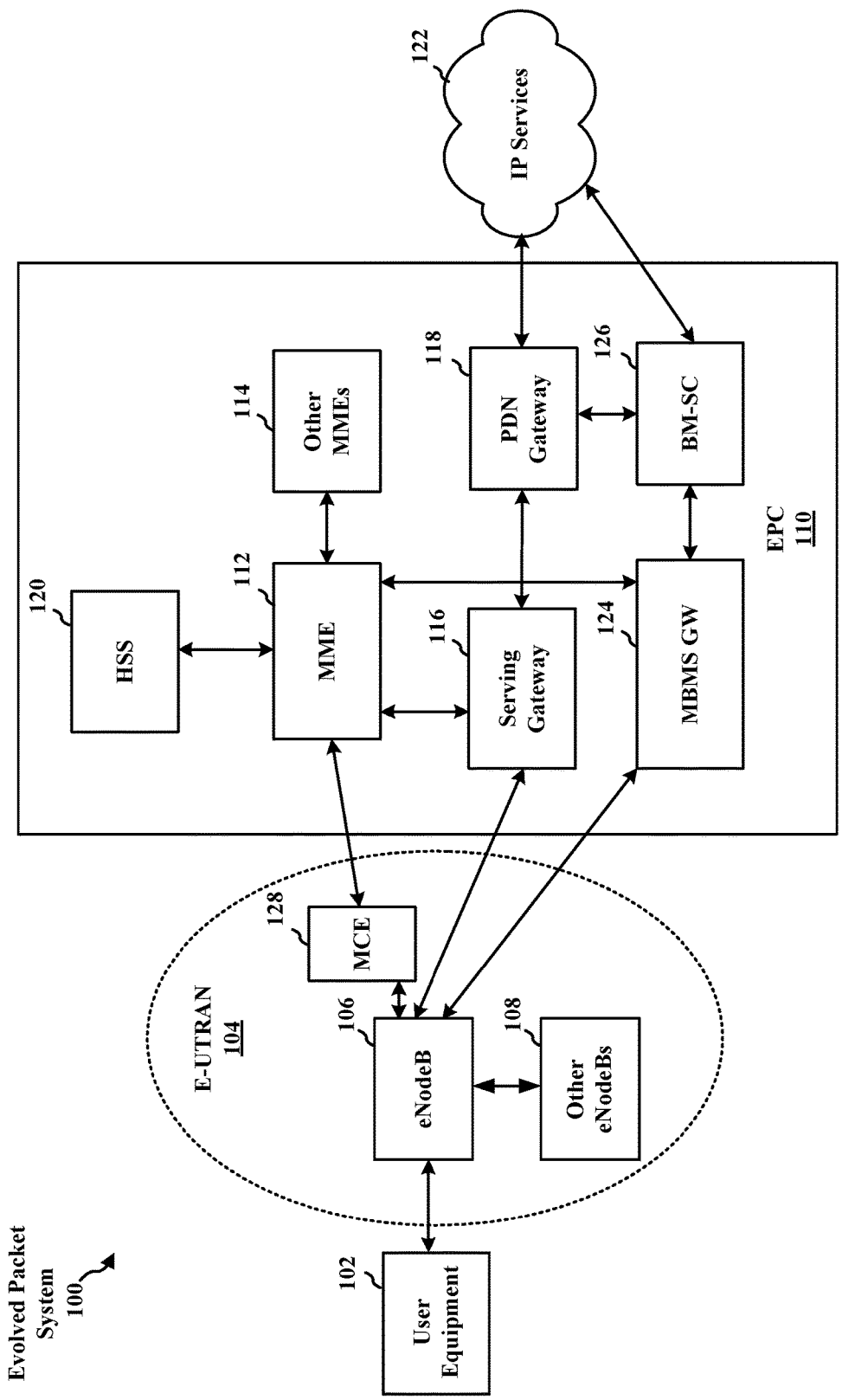
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108, and may include a Multicast Coordination Entity (MCE) 128. The eNB 106 provides user and control planes protocol terminations toward the UE 102. The eNB 106 may be connected to the other eNBs 108 via a backhaul (e.g., an X2 interface). The MCE 128 allocates time/frequency radio resources for evolved Multimedia Broadcast Multicast Service (MBMS) (eMBMS), and determines the radio configuration (e.g., a modulation and coding scheme (MCS)) for the eMBMS. The MCE 128 may be a separate entity or part of the eNB 106. The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 may include a Mobility Management Entity (MME) 112, a Home Subscriber Server (HSS) 120, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 and the BM-SC 126 are connected to the IP Services 122. The IP Services 122 may include the Internet, an intranet, an IP Multimedia Subsystem (IMS), a PS Streaming Service (PSS), and/or other IP services. The BM-SC 126 may provide functions for MBMS user service provisioning and delivery. The BM-SC 126 may serve as an entry point for content provider MBMS transmission, may be used to authorize and initiate MBMS Bearer Services within a PLMN, and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

Figure 2:
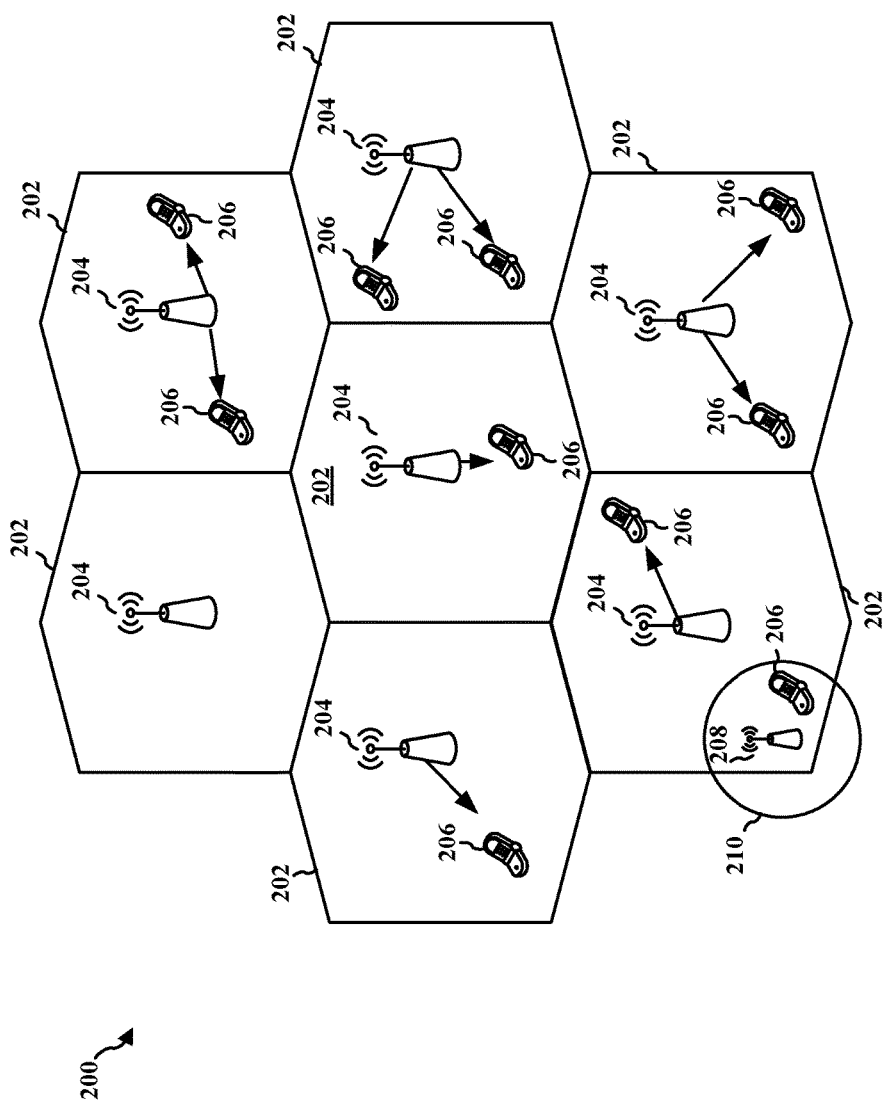
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the Serving Gateway 116. An eNB may support one or multiple (e.g., three) cells (also referred to as a sectors). The term "cell" can refer to the smallest coverage area of an eNB and/or an eNB subsystem serving a particular coverage area. Further, the terms "eNB," "base station," and "cell" may be used interchangeably herein.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
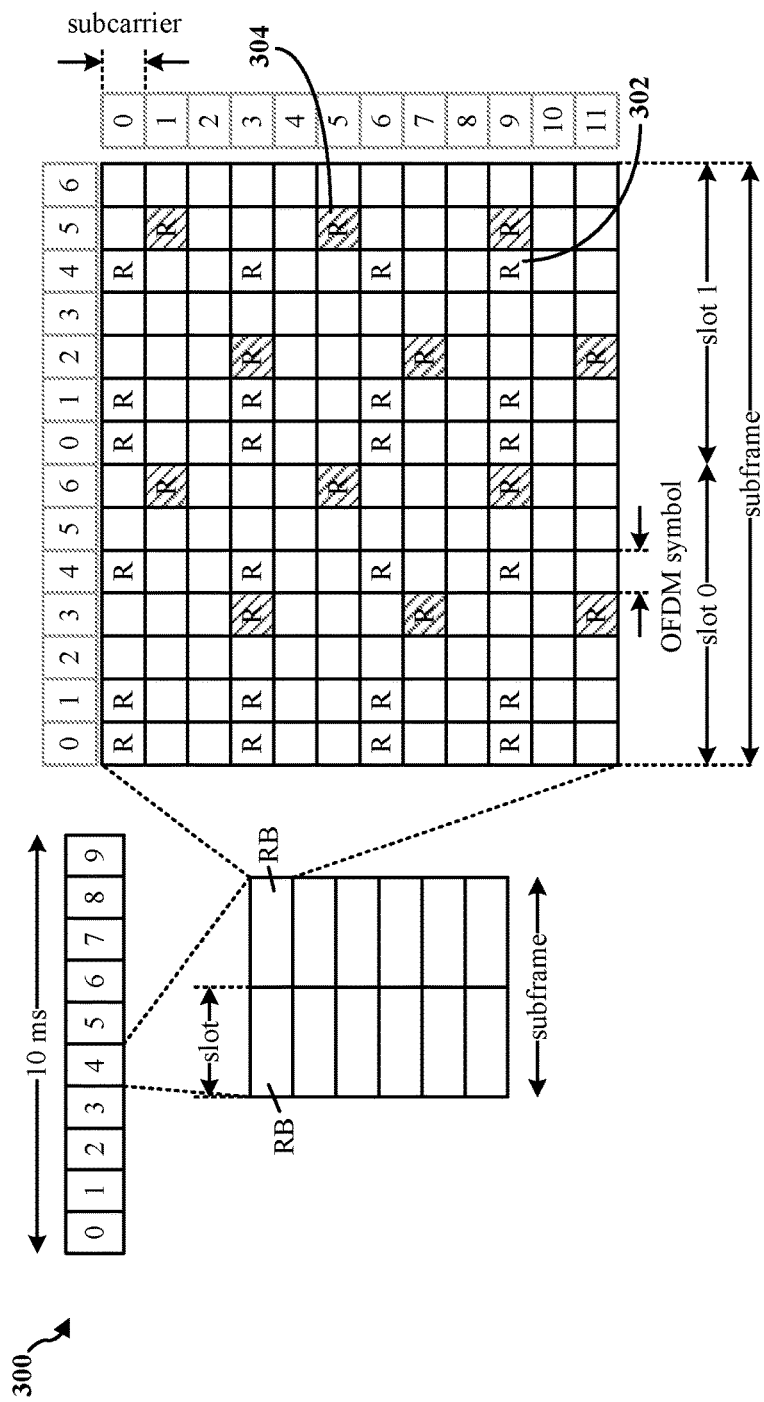
FIG. 3 is a diagram illustrating an example of a DL frame structure in LTE.

FIG. 3 is a diagram 300 illustrating an example of a DL frame structure in LTE. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, for a normal cyclic prefix, a resource block contains 12 consecutive subcarriers in the frequency domain and 7 consecutive OFDM symbols in the time domain, for a total of 84 resource elements. For an extended cyclic prefix, a resource block contains 12 consecutive subcarriers in the frequency domain and 6 consecutive OFDM symbols in the time domain, for a total of 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
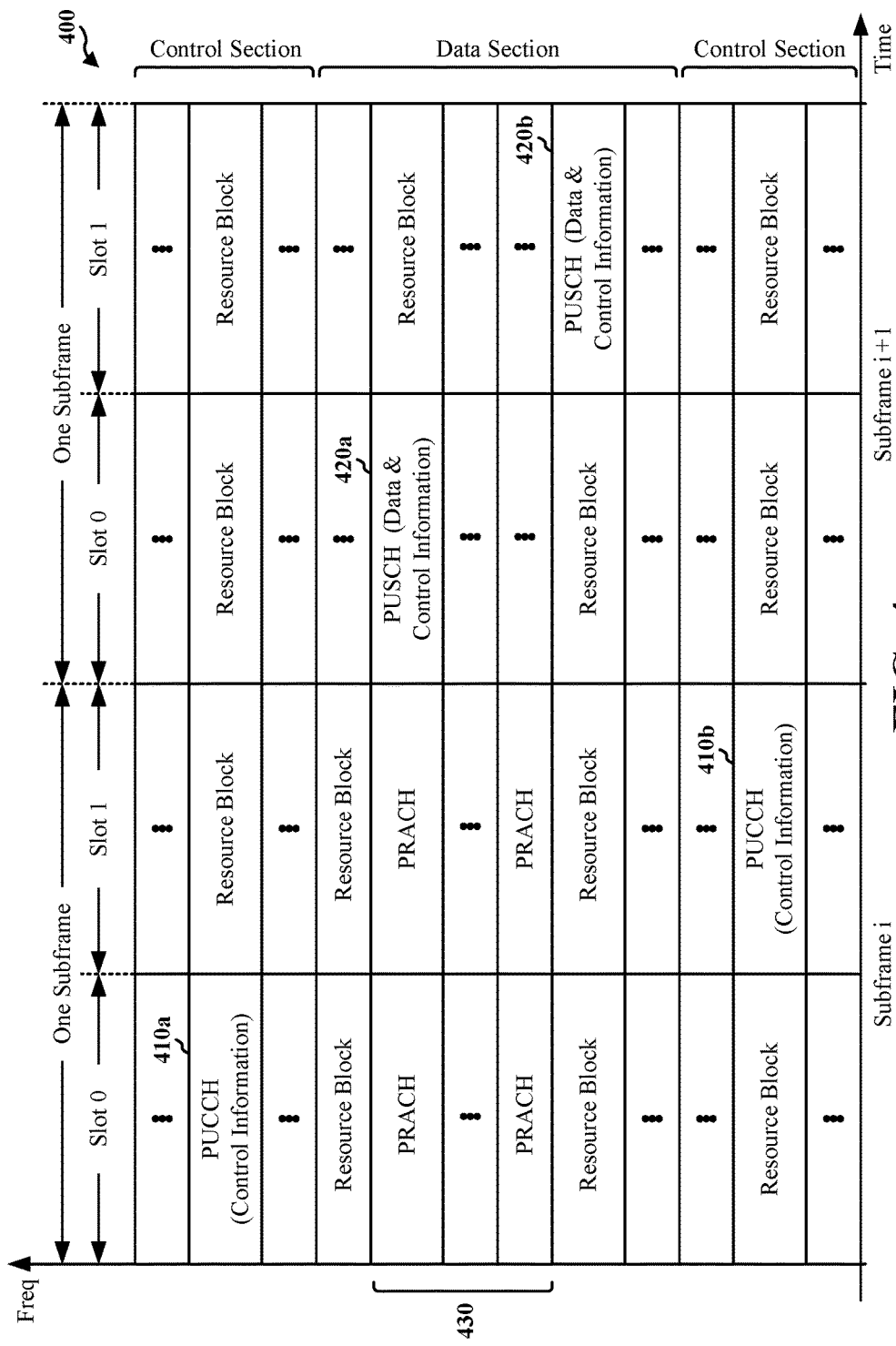
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make a single PRACH attempt per frame (10 ms).

Figure 5:
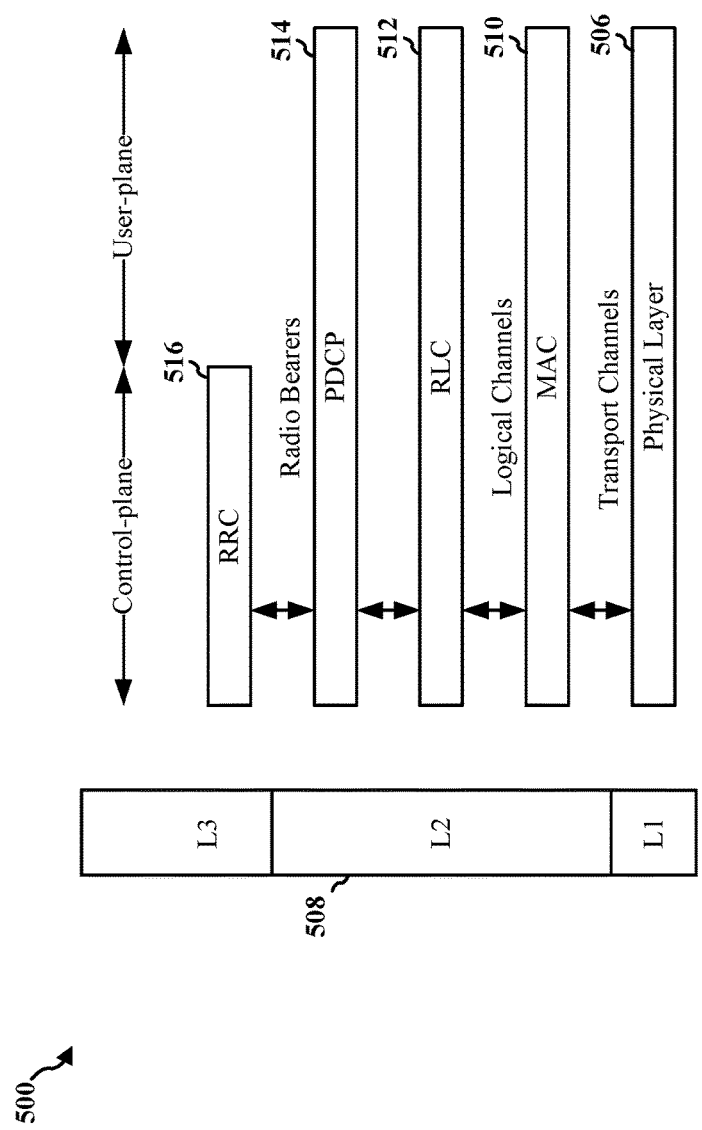
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN Gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

Figure 6:
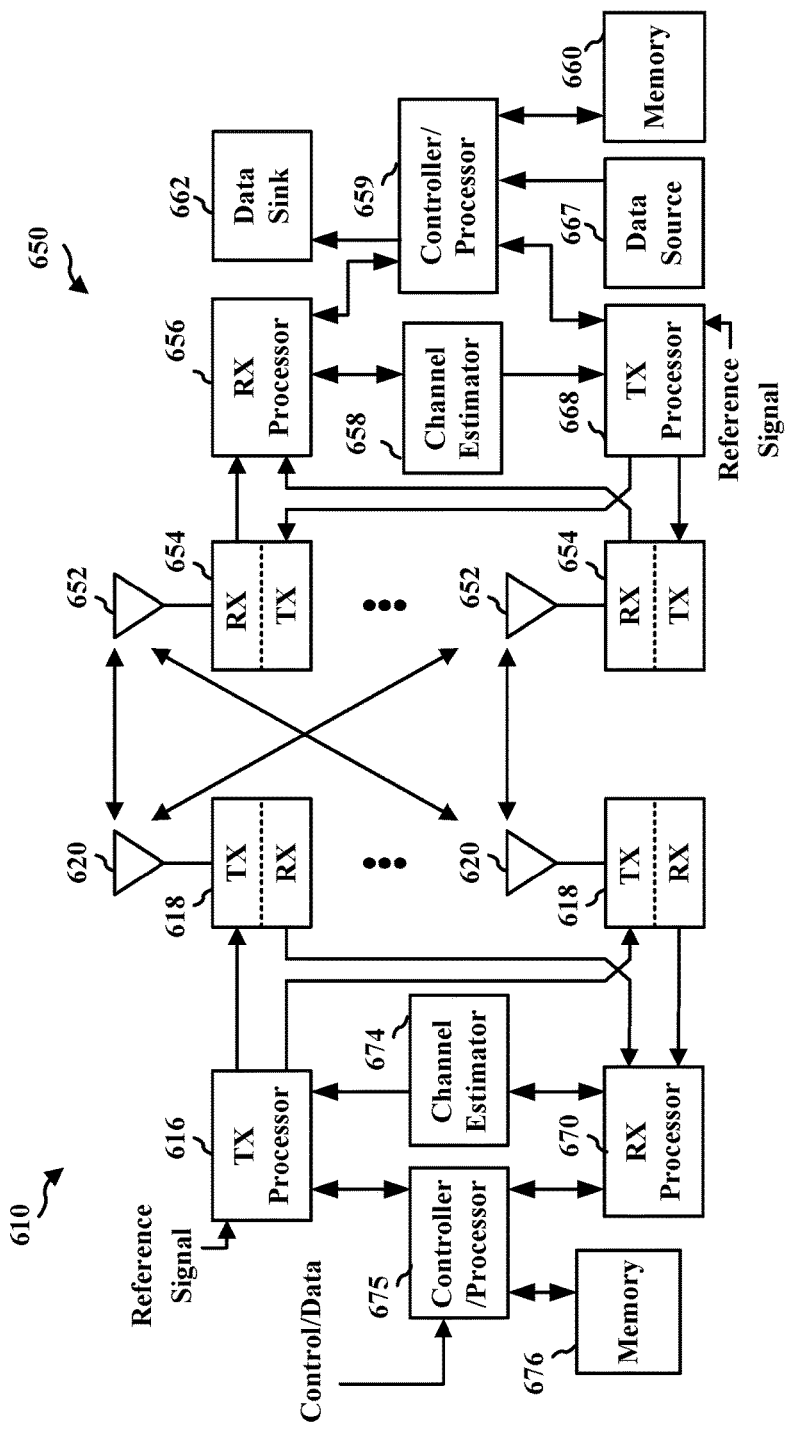
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream may then be provided to a different antenna 620 via a separate transmitter 618TX. Each transmitter 618TX may modulate an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 may perform spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figures 7A, 7B:
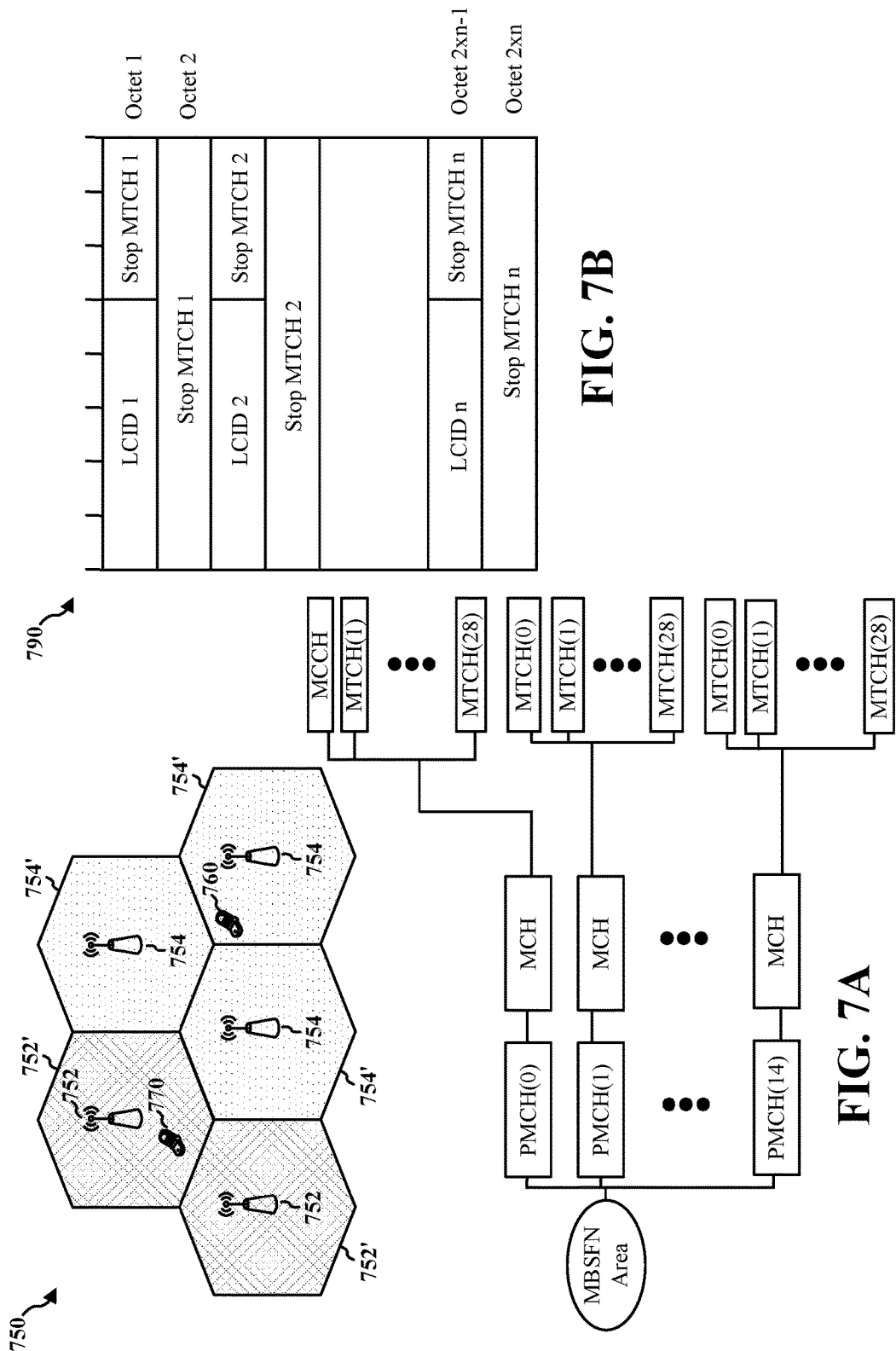
FIG. 7A is a diagram illustrating an example of an evolved Multimedia Broadcast Multicast Service channel configuration in a Multicast Broadcast Single Frequency Network.
FIG. 7B is a diagram illustrating a format of a Multicast Channel Scheduling Information Media Access Control element.

FIG. 7A is a diagram 750 illustrating an example of an evolved MBMS (eMBMS) channel configuration in an MBSFN. The eNBs 752 in cells 752' may form a first MBSFN area and the eNBs 754 in cells 754' may form a second MBSFN area. The eNBs 752, 754 may each be associated with other MBSFN areas, for example, up to a total of eight MBSFN areas. A cell within an MBSFN area may be designated a reserved cell. Reserved cells do not provide multicast/broadcast content, but are time-synchronized to the cells 752', 754' and may have restricted power on MBSFN resources in order to limit interference to the MBSFN areas. Each eNB in an MBSFN area synchronously transmits the same eMBMS control information and data. Each area may support broadcast, multicast, and unicast services. A unicast service is a service intended for a specific user, e.g., a voice call. A multicast service is a service that may be received by a group of users, e.g., a subscription video service. A broadcast service is a service that may be received by all users, e.g., a news broadcast. Referring to FIG. 7A, the first MBSFN area may support a first eMBMS broadcast service, such as by providing a particular news broadcast to UE 770. The second MBSFN area may support a second eMBMS broadcast service, such as by providing a different news broadcast to UE 760. Each MBSFN area supports one or more physical multicast channels (PMCH) (e.g., 15 PMCHs). Each PMCH corresponds to a multicast channel (MCH). Each MCH can multiplex a plurality (e.g., 29) of multicast logical channels. Each MBSFN area may have one multicast control channel (MCCH). As such, one MCH may multiplex one MCCH and a plurality of multicast traffic channels (MTCHs) and the remaining MCHs may multiplex a plurality of MTCHs.

A UE can camp on an LTE cell to discover the availability of eMBMS service access and a corresponding access stratum configuration. Initially, the UE may acquire a system information block (SIB) 13 (SIB13). Subsequently, based on the SIB13, the UE may acquire an MBSFN Area Configuration message on an MCCH. Subsequently, based on the MBSFN Area Configuration message, the UE may acquire an MCH scheduling information (MSI) MAC control element. The SIB13 may include (1) an MBSFN area identifier of each MBSFN area supported by the cell; (2) information for acquiring the MCCH such as an MCCH repetition period (e.g., 32, 64, . . . , 256 frames), an MCCH offset (e.g., 0, 1, . . . , 10 frames), an MCCH modification period (e.g., 512, 1024 frames), a signaling modulation and coding scheme (MCS), subframe allocation information indicating which subframes of the radio frame as indicated by repetition period and offset can transmit MCCH; and (3) an MCCH change notification configuration. There is one MBSFN Area Configuration message for each MBSFN area. The MBSFN Area Configuration message may indicate (1) a temporary mobile group identity (TMGI) and an optional session identifier of each MTCH identified by a logical channel identifier within the PMCH, and (2) allocated resources (i.e., radio frames and subframes) for transmitting each PMCH of the MBSFN area and the allocation period (e.g., 4, 8, . . . , 256 frames) of the allocated resources for all the PMCHs in the area, and (3) an MCH scheduling period (MSP) (e.g., 8, 16, 32, . . . , or 1024 radio frames) over which the MSI MAC control element is transmitted.

FIG. 7B is a diagram 790 illustrating the format of an MSI MAC control element. The MSI MAC control element may be sent once each MSP. The MSI MAC control element may be sent in the first subframe of each scheduling period of the PMCH. The MSI MAC control element can indicate the stop frame and subframe of each MTCH within the PMCH. There may be one MSI per PMCH per MBSFN area.

Some communication systems, such as the IP Multimedia Core Network Subsystem (IMS), may implement multimedia telephony functions (e.g., MMTeL service provided by 3GPP). (IP stands for internet protocol.) An example of the multimedia telephony functions may include multimedia sessions of audio and/or video Voice over IP (VoIP) calls. An example of such multimedia telephony service may include the Multimedia Telephony Service for IMS (MTSI) also set forth by 3GPP. In some embodiments, it may be advantageous for the network to receive certain quality of experience metrics related to the multimedia sessions at a UE. Examples of the quality of experience metrics may include data drop (e.g., packets dropped) and codec performance information in a multimedia session. The service provider may then adjust the network to improve the qualities of the multimedia sessions in response to the received quality of experience metrics. MTSI provides a set of Quality of Experience (QoE) metrics for the UEs to measure and report to the network.

FIG. 8 is a diagram 800 illustrating an example of a network architecture for configuring and reporting QoE metrics. In some aspects, an Open Mobile Alliance Device Management (OMA-DM) configuration server 816 configures a UE 806 via a link 817. Examples of the configuration may include activation and deactivation of the QoE feature, measurement interval (e.g., "Measure-Resolution"), reporting interval (e.g., "Sending-Rate"), and various QoE metrics for measurement and report (described in further detail below).

The UE 806 may measure the QoE metrics 819 in accordance with the configuration provided via the link 818. In some examples, the UE 806 may perform the measurements at the Real-time Transport Protocol (RTP) layer and/or higher protocol layers. For example, the UE 806 may perform the quality measurements in accordance with the measurement definitions of the configuration, aggregate the measurements into client QoE metrics, and report the metrics to the QoE server 826 via a Hypertext Transfer Protocol (HTTP) link 818. The UE 806 may report the QoE metrics to the receiving QoE server 826 during the multimedia session and/or at the end of the session.

The HTTP link 818 may utilize the E-UTRAN 104 and the EPC 110 described in FIG. 1. For example, the HTTP link 818 may utilize the eNB 106 within the E-UTRAN 104. The HTTP link 818 may likewise utilize the Serving Gateway 116 and the PDN Gateway 118 of the EPC 110.

Some examples of the QoE metrics are provided below. The QoE metrics may include corruption duration, which may correspond to a time period from the network protocol time (NPT) of the last good frame before the corruption (since the network time for a first corrupted frame cannot always be determined), to the NPT of the first subsequent good frame. For example, a corrupted frame may be a lost frame, or a media frame with quality degradation, e.g., where the decoded frame is not the same as the error-free decoded frame.

In some examples, the QoE metrics may include successive loss of RTP packets, which may indicate the number of RTP packets lost in succession per media channel. The QoE metrics may include frame rate, which may indicate the playback frame rate. The QoE metrics may include jitter duration. Jitter may happen when the absolute difference between the actual playback time and the expected playback time is larger than a defined JitterThreshold. The expected time of a frame may be equal to the actual playback time of the last played frame plus the difference between the NPT of the frame and the NPT of the last played frame.

The QoE metrics may include sync loss duration. Sync loss may happen when the absolute difference between value A and value B is larger than a defined SyncThreshold. In some examples, value A represents the difference between the playback time of the last played frame of the video stream and the playback time of the last played frame of the speech/audio stream. Value B represents the difference between the expected playback time of the last played frame of the video stream and the expected playback time of the last played frame of the speech/audio stream.

The QoE metrics may include round-trip time (RTT), which may include the RTP-level round-trip time, plus the additional two-way delay (e.g., RTP level to loud speaker to microphone to RTP level) due to buffering and other processing in a client. The QoE metrics may include average codec bitrate, which may correspond to the bitrate used for coding active media information during the measurement resolution period. The QoE metrics may include codec information, which may include details of the media codec used during the measurement resolution period. The service provides may manage, for example, resources allocations based on the QoE metrics. For example, the network may slow down the multimedia data throughput to a particular UE if the UE is experiencing slow frame rate or high packet losses.

In addition to the measuring and reporting of the quality of experience or QoE metrics, UEs may be tasked with measuring and reporting of metrics relating to radio signal qualities, which may be, for example, related to quality of services or QoS metrics (which is described in further details below). In one example, mobile communication networks monitor and optimize these signal quality data in order to provide a good network coverage and quality of service. For example, coverage holes may be cause by an obstruction such as a building. To detect and to mitigate such problems, radio measurements may be needed. In one example, these radio measurements are known as Drive Tests (DTs) and may be obtained by cars with measurement equipment. These collected data in a UE may provide a snapshot of the cell coverage at a certain time and location, and the service providers may use the reported data to improve network coverage and quality of service.

In one example, 3GPP has set forth a set of measurements known as the Minimization of Drive Tests or MDT for these measurements. In one example, UEs may be used to measure the radio signal qualities described above (such as the DTs) to obtain the MDT metrics. For example, the various releases of 3GPP define the architecture (e.g., see FIG. 9) and the basic functions of MDT. In some examples, the MDT measurement and report may be implemented within the MBSFN system described in FIGS. 7A and 7B. The MDT metrics (e.g., information or parameters contained in a MDT log) may include location information, multiple PLMN support, QoS verification, and accessibility report. Some of the MDT metrics may include: physical cell identity of the logged cell, carrier frequency, pilot strength. The MDT metrics for the MBSFN may include area identity, Received Signal Strength Indicator, Reference Signal Received Power, MCH Block Error Rate for signalling and data, and related MCH index. The MDT metrics may include a relative time stamp in second. The time stamp may indicate the point in time when periodic logging timer expires. The MDT metrics may include the absolute time stamp, which is the current network time echoed back by the UE. The MDT metrics may include Global Navigation Satellite System location information. The MDT metrics may include various RF measurements. The MDT metrics may include data volume measurement separately for DL and UL on a per QoS Class Identifier (QCI) basis. For example, the measured QCI=1 may include voice traffic and QCI=2 traffic may include video traffic. These MDT metrics are provided as examples and do not limit the scope of the disclosure in any way.

In some examples, the MDT metrics may include necessary MDT measurements and procedure capabilities needed for QoS verification. For example, the MDT data reported from UEs may be used to verify Quality of Service by assessing user experience from the Radio Access Network (RAN) perspective. For example, the MDT metrics may include information of where data traffic is transferred within a cell for this purpose. For QoS verification, the MDT metrics may include assessing the performance of multimedia telephony voice and video, e.g. delay and/or packet loss rate of the PDCP layer. The MDT metrics may further include necessary MDT measurements and information regarding procedure capabilities for mobility performance of multimedia telephony voice and video (e.g. adding tags to the existing Radio Link Failure or RLF report in order to derive the particular multimedia telephony voice and video traffic failures). The MDT metrics may include necessary MDT measurements and information regarding procedure capabilities for identifying hotspot areas of MMTEL voice and video. For example, using the data volume measurement and the location information, the network may identify the hotspot areas of MMTEL traffic.

Figure 9:
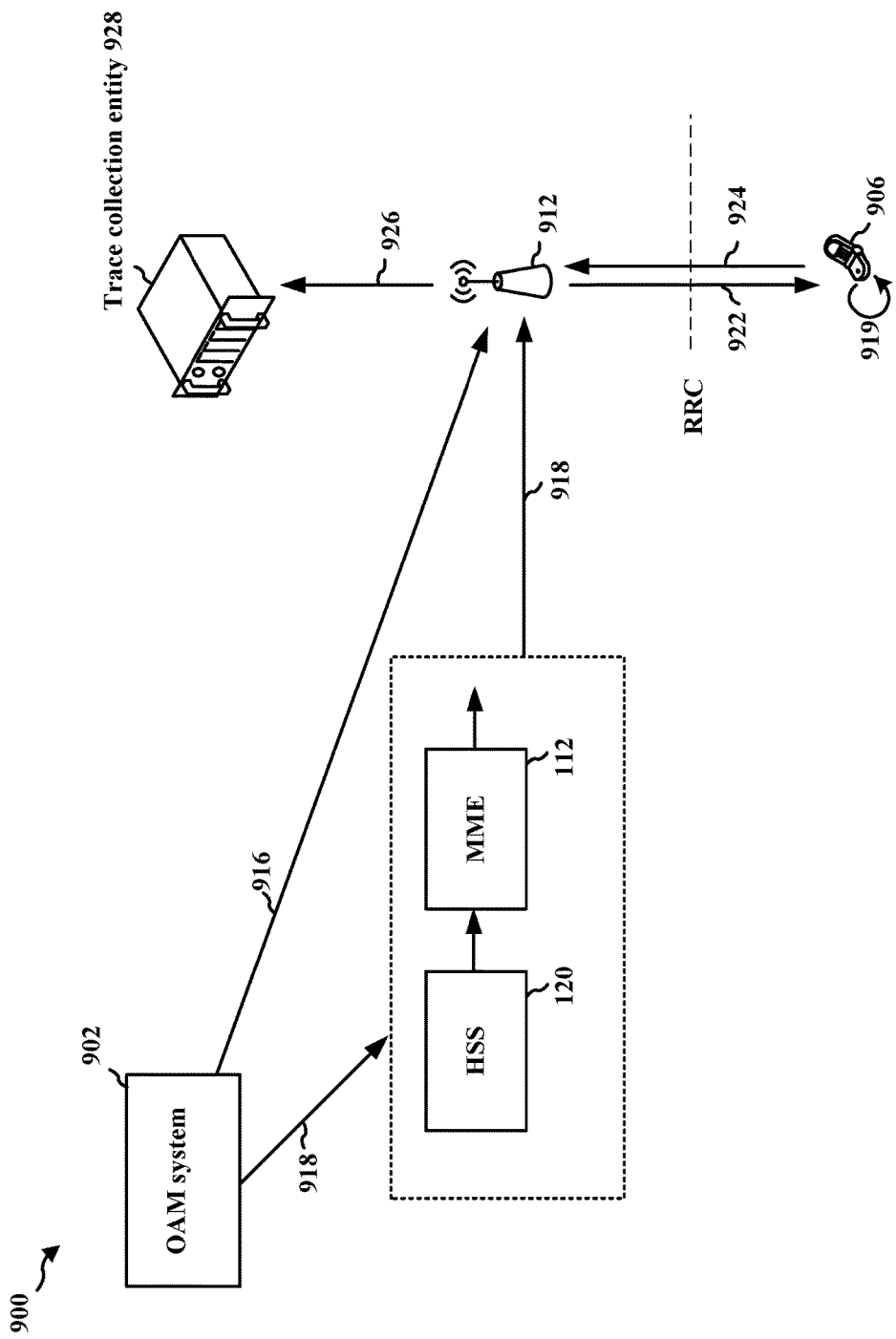
FIG. 9 is a diagram illustrating an example of a network architecture for configuring and reporting MDT metrics.

FIG. 9 is a diagram 900 illustrating an example of a network architecture for configuring and reporting MDT metrics. The diagram 900 provides that, in some examples, the operations, administration and management (OAM) system 902 provides the UE-specific MDT configuration to the eNB 912 via the path 918. The path 918 may utilize the HSS 120 and the MME 112 described in FIG. 1. The OAM system 902 may further provide the area-based MDT configuration to the eNB 912 via the path 916. That is, the path 916 may utilize the E-UTRAN 104 to provide the area-based MDT configuration to all UEs within a particular area, without using the HSS 120 and the MME 112.

The configurations may include, for example, the activation and deactivation of the MDT measurements and reporting. The configurations may further include the measurement interval and/or the report interval for the MDT metrics. The eNB 912 may provide the configurations to the UE 906 via the RRC signaling 922. The UE 906 may perform the MDT measurement 919 in accordance with the received configurations. The UE 906 may report 924 the measured MDT metrics in logs and report the logs to the eNB 912. The eNB 912 may provide the logs (at 926) including the MDT metrics to the trace collection entity 928 (which may be, for example, a file server) of the network.

Figure 10:
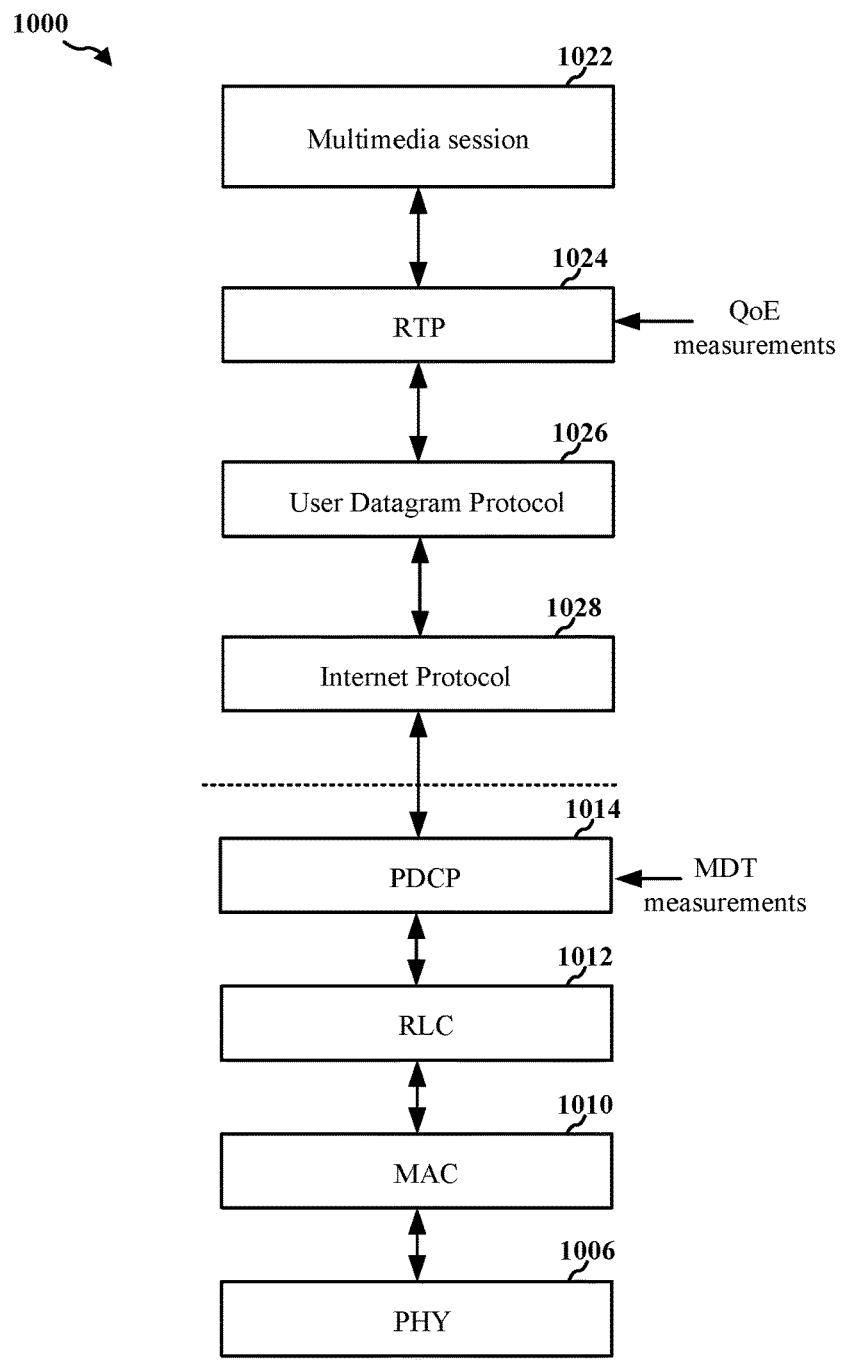
FIG. 10 is a diagram illustrating the various layers of a multimedia session.

In some examples, the MDT metrics may be measured and collected by a UE at the PDCP and lower protocol layers. As described above, the QoE metrics may be measured and collected by a UE at the RTP layer and/or higher protocol layers. FIG. 10 is a diagram 1000 illustrating the various layers of a multimedia session. The multimedia session 1022 may be an audio or video call (e.g., a multimedia telephony function). The session is communicated (e.g., transmitted and received) via the RTP layer 1024. The UE may measure the QoE metrics at the RTP layer 1024. The RTP layer is communicated via the User Datagram Protocol (UDP) transport layer 1026. The UDP layer 1026 is communicated via the Internet Protocol layer 1028. In the eNB and/or the UE, the multimedia session 1022 may be communicated via the PDCP layer 1014, the RLC layer 1012, the MAC layer 1010, and the PHY layer 1006. Examples of these layers are described above with reference to FIG. 5. The UE may measure the MDT metrics at the PDCP layer 1014.

Both the QoE and the MDT measurements are useful for QoS/QoE verification and network optimization. Thus, the network may advantageously utilize both the QoE and MDT metrics. For example, the received correlation information to allow the two types of metrics to be correlated. For example, if the network operator (e.g., a service provider) observes a high packet loss rate at the RTP layer, the network operator could identify the cause of the RTP packet loss using the appropriate correlation information (e.g., using the SN offset to determine whether the loss occurred at the PDCP or an upper layer). If network operator observes a long RTT, the network operator would be able to determine how much of the delay is caused by the air interface with the correlation information. For example, a large SN offset may indicate that the packet loss occurred before the PDCP layer.

Figure 11:
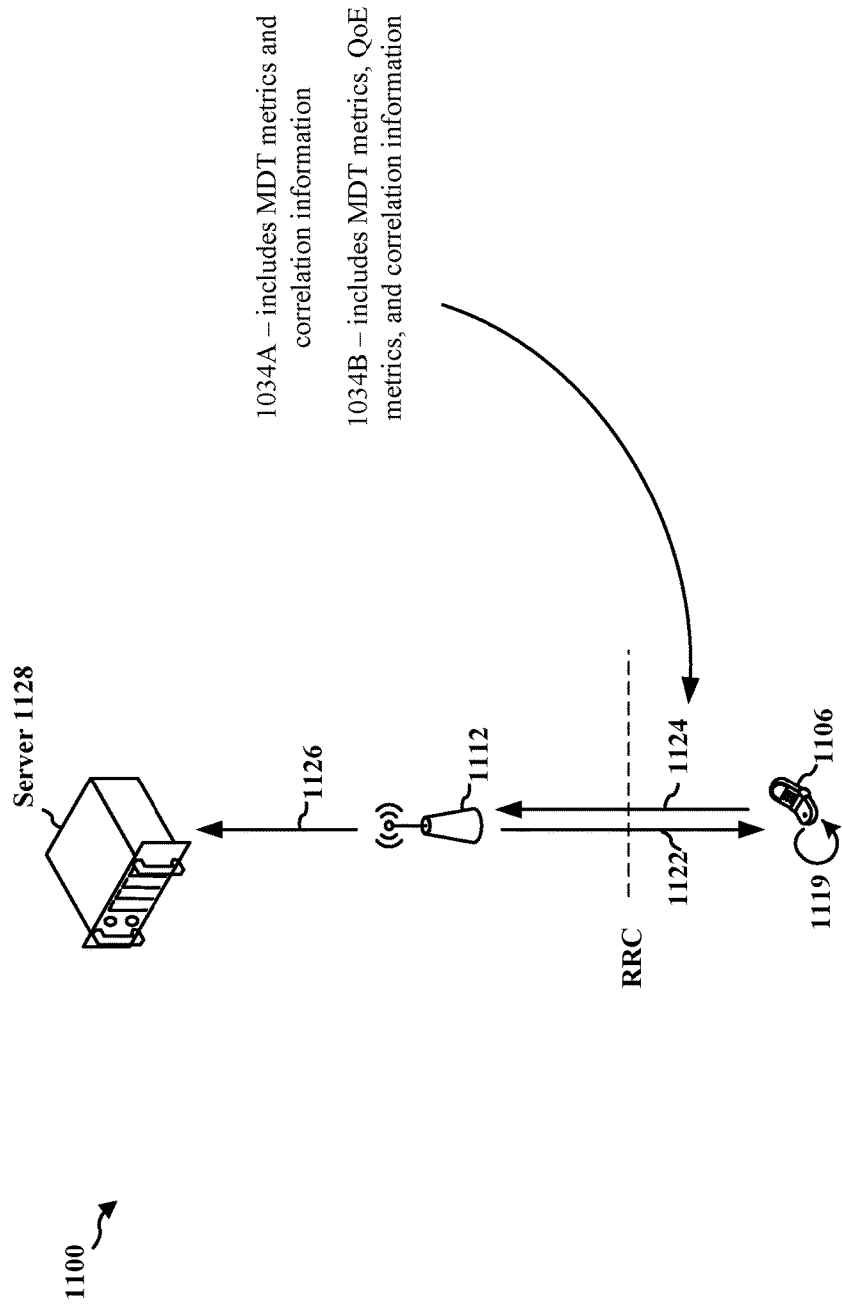
FIG. 11 is a diagram illustrating an exemplary network architecture for reporting correlation information correlating the MDT metrics and the QoE metrics.

FIG. 11 is a diagram 1100 illustrating an exemplary network architecture for generating and reporting correlation information correlating the MDT metrics and the QoE metrics. The correlation information may be provide in terms of the MDT or QoE metrics. In some aspects, the correlation information may include QoE metrics and may be reported with the MDT reporting. In some examples, the correlation information may include MDT parameters and may be reported with the QoE reporting. The diagram 1100 provides that the eNB 1112 may provide the configuration information to the UE 1106 via the RRC signaling 1122. In one example, the configuration information provided by the eNB 1112 may include the MDT configuration information (e.g., as described with reference to FIG. 9). In one example, the configuration information provided via the RRC signaling 1122 may include both the MDT and the QoE configuration information.

The UE 1106 may measure and determine (at 1119) the MDT metrics and/or the QoE metrics in accordance with the configuration information received via the RRC signaling 1122. Moreover, the UE 1106 may generate (at 1119) the correlation information based on the MDT metrics and/or the QoE metrics. In one example, the configuration information may include information for associating at least one MDT metric with at least one QoE metric.

The UE 1106 may then report the measured MDT metrics, QoE metrics, and/or the determined correlation information via the RRC signaling 1124. In one example 1034A, the UE 1106 may report the MDT metrics and the correlation information via the RRC signaling 1124. In another example 1034B, the UE 1106 may report the MDT metrics, the QoE metrics, and the correlation information via the RRC signaling 1124. The eNB 1112 may then provide, for example, the MDT and the QoE metrics and the correlation information to a server 1128 in the network via a path 1126.

In one example, the correlation information may include parameters (e.g., attributes) of the QoE metrics. The correlation information may include UE and/or session identifier information. For example, the correlation information may include QoE attributes clientId and callId for correlation of the UE 1106 and the multimedia session (e.g., an audio and/or video call) with the QoE metrics. The callId attribute may identify the call identity of the Session Initiation Protocol (SIP) session. The clientId attribute may include a unique identifier for the receiver (e.g. the MSISDN or Mobile Station International Subscriber Directory Number of the UE 1106). In one example, by including the QoE attributes clientId and callId in the MDT log, the MDT parameters in the log are correlated with the QoE attributes clientId and callId.

In one example, the correlation information may include time information. For example, the correlation information may include QoE attributes startTime and stopTime to identify the client NTP time when the measurements (included in the report) were started and stopped. The time may be based on the local real-time clock in the client (e.g., the UE 1106), and might not be consistent with the true NTP time. However, assuming that the reporting is done without any extra delay, the server may use the stopTime attribute to correct the timestamps if necessary. The UE 1106 may receive Coordinated Universal Time (UTC) information from SIB16. If the local time (which is used in the QoE metrics report) is different from the UTC time, the UE 1106 may include the time difference between the UTC and the local time in the MDT report as the correlation information. If SIB16 is not available, the UE may report its local time and corresponding SFN and subframe number to the eNB 1112 in the MDT report (e.g., as the correlation information) for time correlation. In one example, by including the QoE attributes startTime and stopTime in the MDT log, the MDT parameters in the log are correlated with the QoE attributes startTime and stopTime.

In one example, the correlation information may include information for correlation of PDCP and RTP (e.g., for corrosion of the serial numbers or SNs). Typically, one RTP data unit (e.g., protocol data unit or PDU) is carried over one PDCP data unit (PDU). The mapping between the PDCP SN and the RTP SN could be included into the MDT report, for example, as: {RTP SN, SN Difference=RTP SN−PDCP SN}. The mapping (e.g., the SN difference) may change during mobility, segmentation or concatenation. When it is changed, the UE 1106 may add a new element into an SN correlation list. An example is shown below:

```
RTPPDCP-Correlation ::=   SEQUENCE {
    RTP-SN                INTEGER (0..65535),
    SN-Difference INTEGER (0..65535)
}
SN-Correlation-List       ::=  SEQUENCE OF RTPPDCP-Correlation
```

In some configurations, to avoid duplication, the QoE configuration and metrics may be combined into the MDT, as provided below. In one example, the configuration of the QoE metrics measurement and report may be combined with the MDT configuration. For example, the QoE configuration may be provided to the UE 1106 via the same RRC signaling (e.g., RRC signaling 1122) for the MDT configuration. As an example, the QoE configuration may be provided in an RRC message of Immediate MDT configuration. In this example, the Immediate MDT allows measurements in a connected state. The QoE configuration parameters may be included in the RRC message (e.g., RRC Connection Reconfiguration) of Immediate MDT configuration either as a container or as at least one or several separate parameters. In one example, the measurement interval and/or the reporting interval may be shared by the MDT and QoE metrics. For example, the measuring of the MDT and QoE metrics may be performed at or based on a same measurement interval, and the reporting of the MDT and QoE metrics may be performed at or based on a same reporting interval.

The QoE metrics may be combined in the RRC signal signaling for the MDT report (e.g., RRC signaling 1124). In one example, the reporting RRC message (Measurement Report) may include parameter groups: MDT measurements, QoE metrics (either as container or at least one separate parameter), and the correlation information (e.g., example 1034B).

Figure 12:
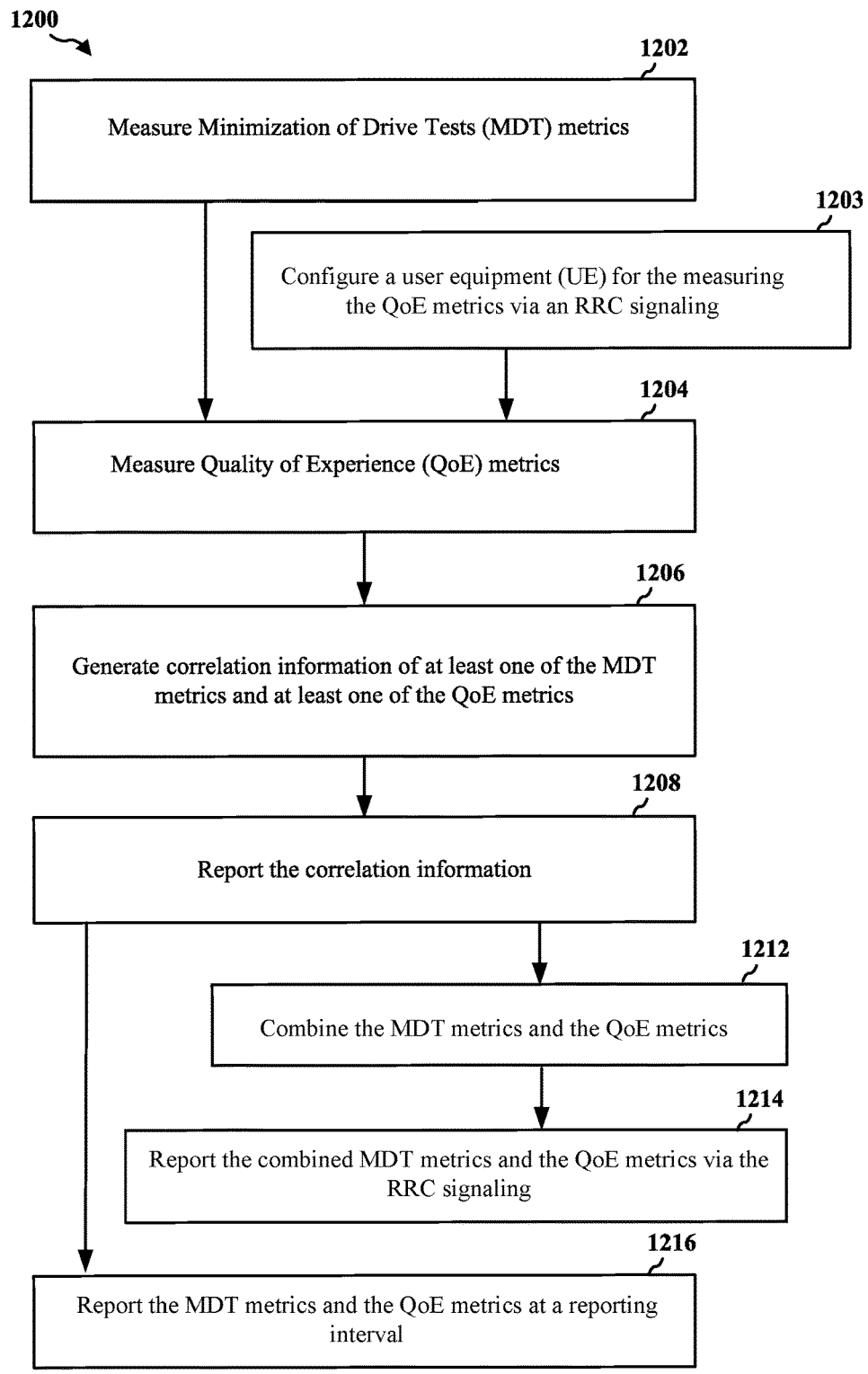
FIG. 12 is a flowchart of a method of wireless communication.

FIG. 12 is a flowchart 1200 of a method of wireless communication. The method may be performed by a UE (e.g., the UE 1106, the apparatus 1302/1302' presented below). Examples of these operations may be found within, for example, the descriptions of FIG. 11. At 1202, the Minimization of Drive Tests (MDT) metrics may be measured. For example, referring to FIG. 9, the OAM system 902 configures the UE for MDT measurement and report via the RRC signaling 922. The UE measures the MDT metrics (at 919) in accordance with the configuration.

At 1203, the UE may be configured for the measuring the QoE metrics via an RRC signaling. Referring to FIG. 11, the UE 1106 may receive the QoE configuration information via the RRC signaling 1122 (which may also be used to provide MDT configuration information of 1202). At 1204, the Quality of Experience (QoE) metrics may be measured. Referring to FIG. 11, the UE 1106 may measure the QoE metrics (at 1119) in accordance with the QoE configuration received at 1203.

At 1206, correlation information of at least one of the MDT metrics and at least one of the QoE metrics may be generated. Referring to FIG. 11, the UE 1106 may generate the correlation information, e.g., time information. In one example, the time information may include the local time of the UE 1106 (which is the time that the client viewed the multimedia session). The local time can be correlated with the time reported in the QoE metrics to enable correlation of the multimedia session with the corresponding QoE metrics. In another example, the correlation information may include an identification of a UE engaged in a multimedia session to correlate the UE with the corresponding QoE metrics. In yet another example, the correlation information may include an identification of a multimedia session to enable correlation of the multimedia session with the corresponding QoE metrics. In yet another example, the correlation information may include information (e.g., the SN offset) to correlate an RTP data unit of a multimedia session with a PDCP data unit.

At 1208, the correlation information may be reported. Referring to FIG. 11, the UE 1106 may report the correlation information generated at 1206 via the RRC signaling 1124. At 1212, the MDT metrics and the QoE metrics may be combined. Referring to FIG. 11, the UE 1106 may combine the QoE metrics with the MDT report. For example, the QoE metrics may be combined with the MDT report and reported via the RRC signal signaling for the MDT report (e.g., RRC signaling 1124). In one example, the reporting RRC message (Measurement Report) may include parameter groups: MDT measurements, QoE Metrics (either as container or separate parameters), and the correlation information (e.g., example 1034B). At 1214, the combined MDT metrics and the QoE metrics may be reported via the RRC signaling. As described with 1212, the combined MDT metrics and the QoE metrics may be reported via the RRC message 1124.

At 1216, the MDT metrics and the QoE metrics may be reported at a reporting interval. Referring to FIG. 11, in one example, the UE 1106 may be configured to measure the MDT metrics and the QoE metrics at a same measurement interval and configured to report the MDT metrics and the QoE metrics at the same report interval.

Figure 13:
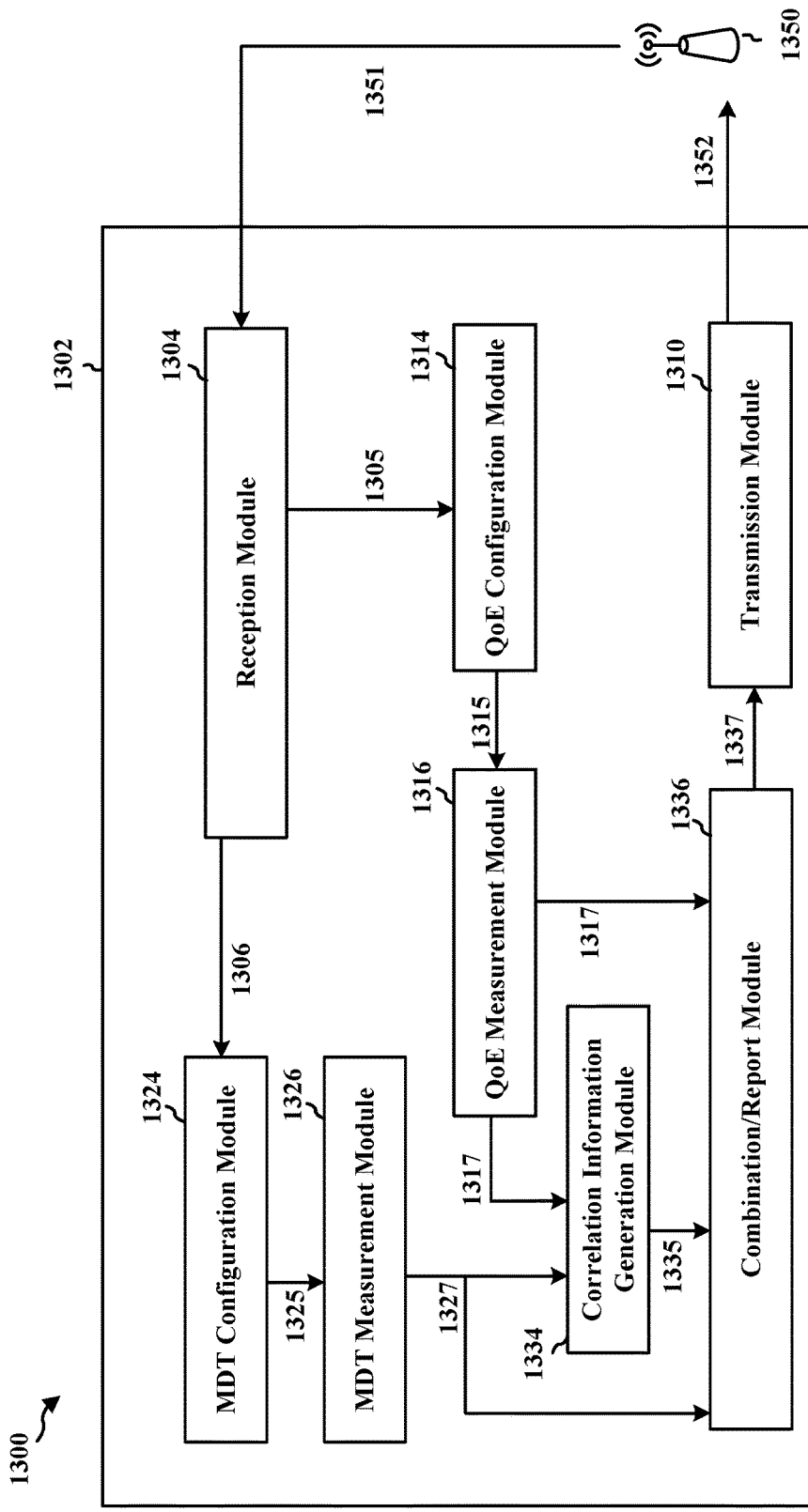
FIG. 13 is a conceptual data flow diagram illustrating the data flow between different modules/means/components in an exemplary apparatus.

FIG. 13 is a conceptual data flow diagram 1300 illustrating the data flow between different modules/means/components in an exemplary apparatus 1302. The apparatus may be a UE. The apparatus includes a reception module 1304 that is configured to receive QoE and MDT configuration information via the RRC signaling 1351 from the eNB 1340 and a transmission module 1308 that is configured to transmit, for example, the QoE metrics, the MDT metric, and the correlation information to the eNB 1340 via the RRC signaling 1352.

The apparatus 1302 may further include a QoE configuration module 1314, which receives the QoE configuration information 1305 from the reception module 1304. The QoE configuration module 1314 configures the apparatus 1302 for QoE metrics measurement and reporting in accordance with the QoE configuration information 1305. The apparatus 1302 may further include a QoE measurement module 1316, which receives the QoE configuration information, such as the measurement interval 1315 from the QoE configuration module 1314. The QoE measurement module 1316 may be configured to perform the measurements of the QoE metrics. For example, the QoE measurement module 1316 may detected codec performance to generate the codec bitrate and codec information for the QoE metrics.

The apparatus 1302 may further include a MDT configuration module 1324, which receives the MDT configuration information 1306 from the reception module 1304. The MDT configuration module 1324 configures the apparatus 1302 for MDT metrics measurement and reporting in accordance with the MDT configuration information 1306. The apparatus 1302 may further include a MDT measurement module 1326, which receives the MDT configuration information, such as a measurement interval 1325 from the MDT configuration module 1324. The MDT measurement module 1326 may be configured to perform the measurements of the MDT metrics. For example, the MDT measurement module 1326 may measure received radio signals (e.g., from the eNB 1350) to detect the signal strength and the location of the UE 1302, which then could be used as coverage indicator for the location.

The apparatus 1302 may further include a correlation information generation module 1334, which receives the QoE metrics 1317 from the QoE measurement module 1316 and the MDT metrics 1327 from the MDT measurement module 1326. The correlation information generation module 1334 is configured to generate the correlation information 1335, which may be information that relates one or more MDT metrics to one or more QoE metrics (e.g., the time information, the UE identifier, the multimedia session identifier, or the SN offset of the RTP data unit and the PDCP data unit, etc. described in reference with FIG. 11).

The apparatus 1302 may further include a combination/report module 1336 which receives the correlation information 1335, the QoE metrics 1317, and the MDT metrics 1327 and generates a report 1337. In one example, the combination/report module 1336 may combine the correlation information 1335, the QoE metrics 1317, and the MDT metrics 1327 into the report 1337, which is provide to the transmission module 1308 to transmit to the eNB 1340 via the RRC signaling 1352.

The apparatus may include additional modules that perform each of the blocks of the algorithm in the aforementioned flowchart of FIG. 12. As such, each block in the aforementioned flowchart of FIG. 12 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 14:
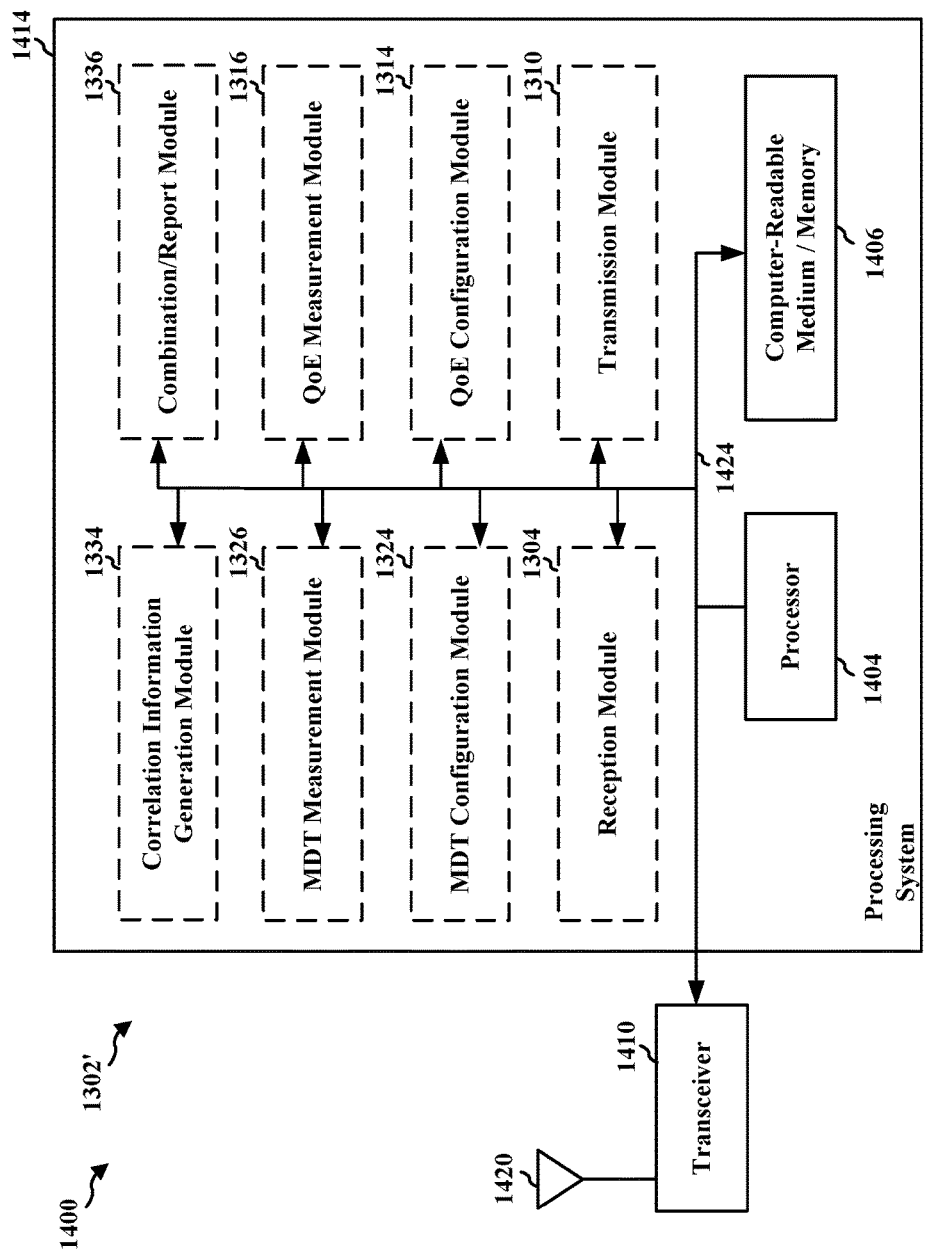
FIG. 14 is a diagram illustrating an example of a hardware implementation for an apparatus employing a processing system.

FIG. 14 is a diagram 1400 illustrating an example of a hardware implementation for an apparatus 1302' employing a processing system 1414. The processing system 1414 may be implemented with a bus architecture, represented generally by the bus 1424. The bus 1424 may include any number of interconnecting buses and bridges depending on the specific application of the processing system 1414 and the overall design constraints. The bus 1424 links together various circuits including one or more processors and/or hardware modules, represented by the processor 1404, the modules 1304, 1310, 1314, 1316, 1324, 1326, 1334, 1336 and the computer-readable medium/memory 1406. The bus 1424 may also link various other circuits such as timing sources, peripherals, voltage regulators, and power management circuits, which are well known in the art, and therefore, will not be described any further.

The processing system 1414 may be coupled to a transceiver 1410. The transceiver 1410 is coupled to one or more antennas 1420. The transceiver 1410 provides a means for communicating with various other apparatus over a transmission medium. The transceiver 1410 receives a signal from the one or more antennas 1420, extracts information from the received signal, and provides the extracted information to the processing system 1414, specifically the reception module 1304. In addition, the transceiver 1410 receives information from the processing system 1414, specifically the transmission module 1310, and based on the received information, generates a signal to be applied to the one or more antennas 1420. The processing system 1414 includes a processor 1404 coupled to a computer-readable medium/memory 1406. The processor 1404 is responsible for general processing, including the execution of software stored on the computer-readable medium/memory 1406. The software, when executed by the processor 1404, causes the processing system 1414 to perform the various functions described supra for any particular apparatus. The computer-readable medium/memory 1406 may also be used for storing data that is manipulated by the processor 1404 when executing software. The processing system further includes at least one of the modules 1314, 1316, 1324, 1326, 1334, and 1336. The modules may be software modules running in the processor 1404, resident/stored in the computer readable medium/memory 1406, one or more hardware modules coupled to the processor 1404, or some combination thereof. The processing system 1414 may be a component of the UE 650 and may include the memory 660 and/or at least one of the TX processor 668, the RX processor 656, and the controller/processor 659.

In one configuration, the apparatus 1302/1302' for wireless communication includes means for measuring MDT metrics, means for measuring QoE metrics, means for generating correlation information of at least one of the MDT metrics and at least one of the QoE metrics, means for reporting the correlation information, means for combining the MDT metrics and the QoE metrics, means for reporting the combined MDT metrics and the QoE metrics via the RRC signaling, means configuring a UE for the measuring the QoE metrics via an RRC signaling, and means for reporting the MDT metrics and the QoE metrics at a reporting interval. The aforementioned means may be one or more of the aforementioned modules of the apparatus 1302 and/or the processing system 1414 of the apparatus 1302' configured to perform the functions recited by the aforementioned means. As described supra, the processing system 1414 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication by an apparatus, comprising:
  measuring Minimization of Drive Tests (MDT) metrics;
  measuring Quality of Experience (QoE) metrics;

generating correlation information of at least one of the MDT metrics and at least one of the QoE metrics;
combining the MDT metrics and the QoE metrics; and
reporting the correlation information and the combined MDT metrics and the QoE metrics using Radio Resource Control (RRC) signaling, wherein the RRC signaling comprises an RRC message, the QoE metrics being in a container or at least one parameter of the RRC message.

2. The method of claim 1, wherein the correlation information includes time information of a user equipment (UE) engaged in a multimedia session.

3. The method of claim 1, wherein the correlation information includes an identification of a UE engaged in a multimedia session.

4. The method of claim 1, wherein the correlation information includes an identification of a multimedia session.

5. The method of claim 1, wherein the correlation information includes information to correlate a Real-time Transport Protocol (RTP) data unit of a multimedia session with a Packet Data Convergence Protocol (PDCP) data unit.

6. The method of claim 1, further comprising:
configuring a user equipment (UE) for the measuring the QoE metrics via the RRC signaling.

7. The method of claim 1, further comprising configuring a user equipment (UE) for the measuring of the QoE metrics via the RRC message.

8. The method of claim 1, wherein the measuring the MDT metrics and the measuring the QoE metrics are performed based on a measurement interval.

9. The method of claim 1, wherein the MDT metrics and the QoE metrics are reported based on a reporting interval.

10. An apparatus for wireless communication, comprising:
means for measuring Minimization of Drive Tests (MDT) metrics;
means for measuring Quality of Experience (QoE) metrics;
means for generating correlation information of at least one of the MDT metrics and at least one of the QoE metrics;
means for combining the MDT metrics and the QoE metrics; and
means for reporting the correlation information and the combined MDT metrics and the QoE metrics using Radio Resource Control (RRC) signaling, wherein the RRC signaling comprises an RRC message, the QoE metrics being in a container or at least one parameter of the RRC message.

11. The apparatus of claim 10, wherein the correlation information includes time information of a user equipment (UE) engaged in a multimedia session.

12. The apparatus of claim 10, wherein the correlation information includes an identification of a UE engaged in a multimedia session.

13. The apparatus of claim 10, wherein the correlation information includes an identification of a multimedia session.

14. The apparatus of claim 10, wherein the correlation information includes information to correlate a Real-time Transport Protocol (RTP) data unit of a multimedia session with a Packet Data Convergence Protocol (PDCP) data unit.

15. The apparatus of claim 10, further comprising:
means for configuring a user equipment (UE) for the measuring the QoE metrics via the RRC signaling.

16. The apparatus of claim 10, further comprising means for configuring a user equipment (UE) for the measuring of the QoE metrics via the RRC message.

17. The apparatus of claim 10, wherein the means for measuring the MDT metrics and the means for measuring the QoE metrics are configured to measure the MDT metrics and the QoE metrics based on a measurement interval.

18. The apparatus of claim 10, further comprising means for reporting the MDT metrics and the QoE metrics based on a reporting interval.

19. An apparatus for wireless communication, comprising:
a memory; and
at least one processor coupled to the memory and configured to:
measure Minimization of Drive Tests (MDT) metrics;
measure Quality of Experience (QoE) metrics;
generate correlation information of at least one of the MDT metrics and at least one of the QoE metrics;
combine the MDT metrics and the QoE metrics; and
report the correlation information and the combined MDT metrics and the QoE metrics using Radio Resource Control (RRC) signaling, wherein the RRC signaling comprises an RRC message, the QoE metrics being in a container or at least one parameter of the RRC message.

20. The apparatus of claim 19, wherein the correlation information includes time information of a user equipment (UE) engaged in a multimedia session.

21. The apparatus of claim 19, wherein the correlation information includes an identification of a UE engaged in a multimedia session.

22. The apparatus of claim 19, wherein the correlation information includes an identification of a multimedia session.

23. The apparatus of claim 19, wherein the correlation information includes information to correlate a Real-time Transport Protocol (RTP) data unit of a multimedia session with a Packet Data Convergence Protocol (PDCP) data unit.

24. The apparatus of claim 19, wherein the at least one processor coupled to the memory and is further configured to:
configure a user equipment (UE) for the measuring the QoE metrics via the RRC signaling.

25. The apparatus of claim 19, wherein the at least one processor is further configured to configure the UE for the measuring of the QoE metrics via the RRC message.

26. The apparatus of claim 19, wherein the at least one processor coupled to the memory and is further configured to measure the MDT metrics and to measure the QoE metrics based on a measurement interval.

27. The apparatus of claim 19, wherein the at least one processor coupled to the memory and is further configured to report the MDT metrics and the QoE metrics based on a reporting interval.

28. A non-transitory computer-readable medium storing computer executable code for wireless communication, the code being executed by a processor, comprising code for:
measuring Minimization of Drive Tests (MDT) metrics;
measuring Quality of Experience (QoE) metrics;
generating correlation information of at least one of the MDT metrics and at least one of the QoE metrics;
combining the MDT metrics and the QoE metrics; and
reporting the correlation information and the combined MDT metrics and the QoE metrics using Radio Resource Control (RRC) signaling, wherein the RRC signaling comprises an RRC message, the QoE metrics being in a container or at least one parameter of the RRC message.

29. The non-transitory computer-readable medium of claim 28, wherein the correlation information includes time information of a user equipment (UE) engaged in a multimedia session.

30. The non-transitory computer-readable medium of claim 28, wherein the correlation information includes an identification of a UE engaged in a multimedia session.

31. The non-transitory computer-readable medium of claim 28, wherein the correlation information includes an identification of a multimedia session.

32. The non-transitory computer-readable medium of claim 28, wherein the correlation information includes information to correlate a Real-time Transport Protocol (RTP) data unit of a multimedia session with a Packet Data Convergence Protocol (PDCP) data unit.

33. The non-transitory computer-readable medium of claim 28, further comprising code for:
   configuring a user equipment (UE) for the measuring the QoE metrics via the RRC signaling.

34. The non-transitory computer-readable medium of claim 28, further comprising code for measuring the QoE metrics via the RRC message.

35. The non-transitory computer-readable medium of claim 28, wherein the measuring the MDT metrics and the measuring the QoE metrics are performed based on a measurement interval.

36. The non-transitory computer-readable medium of claim 28, further comprising code for reporting the MDT metrics and the QoE metrics based on a reporting interval.

* * * * *